SOLOMON JOHNSON, OF SAN FRANCISCO, CALIFORNIA.

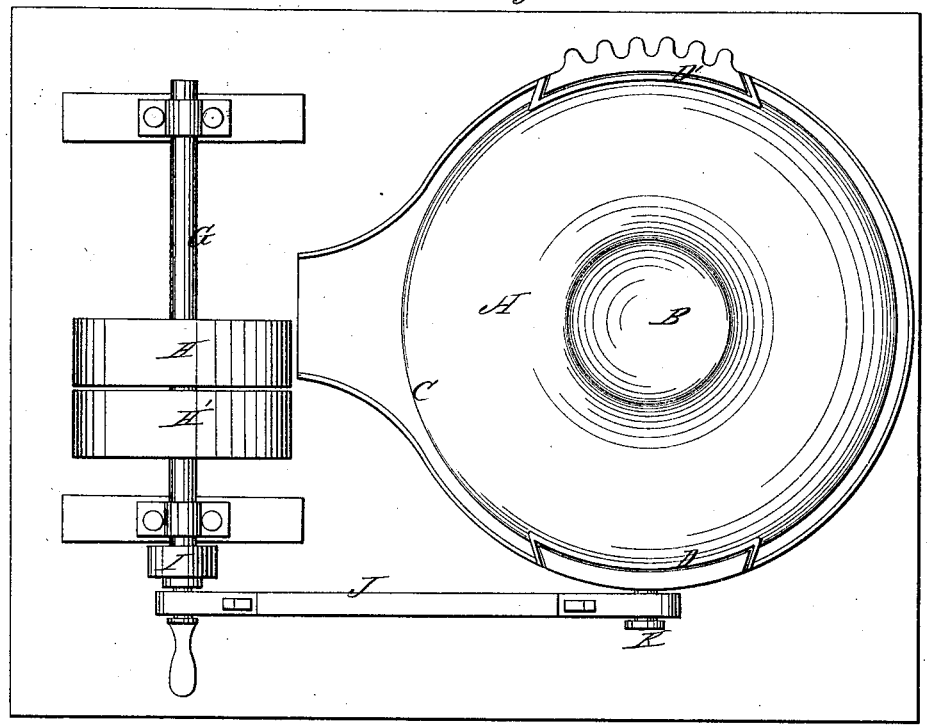
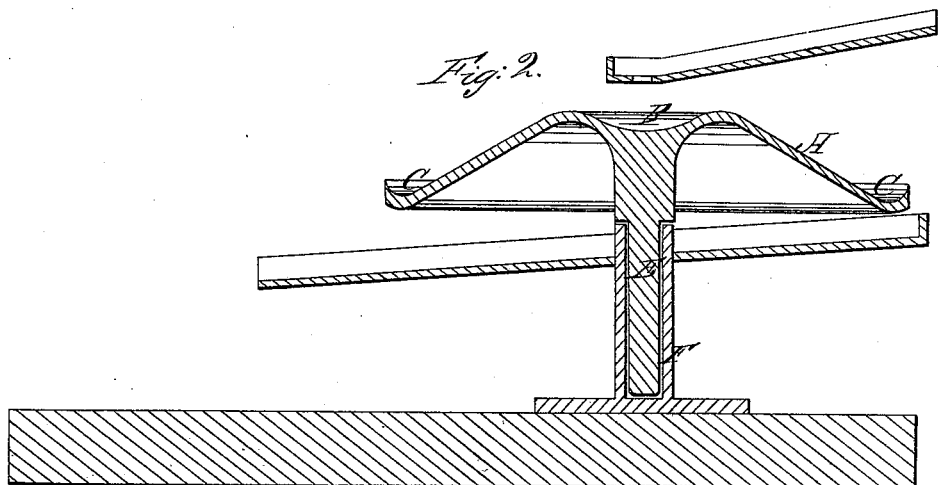

*Letters Patent No. 88,963, dated April 13, 1869.*

IMPROVED AMALGAMATOR.

The Schedule referred to in these Letters Patent and making part of the same.

*To all whom it may concern:*

Be it known that I, SOLOMON JOHNSON, of the city and county of San Francisco, State of California, have invented an Improved Separator and Amalgamator; and I do hereby declare the following description and accompanying drawings are sufficient to enable any person skilled in the art or science to which it most nearly appertains to make and use my said invention, or improvement, without further invention or experiment.

The nature of my invention and improvements consists in providing amalgamating disks, with slotted openings at the edge, with dovetailing, or angular ends, to receive a crank connection, or segmental rack to operate it and connect it with another disk, when required.

To more fully illustrate and describe my invention, reference is had to the accompanying drawings and letters marked thereon, of which—

Figure 1 is a top view.

Figure 2 is a side sectional elevation.

A is the disk, or pan, having a concave centre B, with gradually declining surface, from the highest point of the concavity to an annular channel C.

From this point it is slightly elevated, to an edge.

At each side of the disk, and elevated above the edge, are slotted openings D D', for a crank-connection and segmental rack, whereby more machines may be operated by the same driving-shaft and crank-bar.

The slotted openings in the pan, as well as the crank-connection and segmental rack, are bevelled at their corners, so that when an attachment is made a dovetail connection is had, which may be firmly held by set-screws at one end.

In the centre of the pan is a vertical axis, or spindle E, which operates in an elongated step F, filled with Babbit metal, which is confined to a suitable foundation.

At one side of the pan is placed a horizontal shaft, G, which has a fast-and-loose pulley, H H', upon it.

One end of the shaft is provided with a crank, I, to which the pitman, or connecting-rod J is attached, the opposite end of the pitman being connected to the pan by a pin, K.

The operation of my machine is as follows, to wit:

Water is admitted to this concavity in the centre of the disk, filling it about three inches deep, after which a stream of pulp, or ore from the battery is introduced, together with the water, and as the concavity overflows, the entire surface of the disk will be spread over, or covered with the pulp, when the machine or machines are set in motion, imparting to the disk a horizontal reciprocating, or to-and-fro motion, that will keep the sand and sulphurets loose and in constant agitation, from the centre to the circumference of the pan.

The powdered, or segregated particles of mercury, or quicksilver that come from the battery, or mill with the pulp, by its great specific gravity, will be precipitated, or work its way below the sand and sulphurets, to the amalgamated copper surface of the pan, carrying with it the precious metals, that have a ready affinity for it, while the surplus quicksilver will flow down into the annular channel, around the periphery of the pan, over which the sands and sulphurets, for which the mercury has no affinity, will flow, and be discharged around the edge, or rim of the pan, upon an apron, or otherwise to be further separated, and treated as sulphurets.

It will here be observed that it is not intended to concentrate the sulphurets with my machine, but to save the free metals, that would otherwise be floated away with the sand and water.

If one machine is not sufficient to retain all of the float metal and powdered mercury, other disks may be placed below the first, and be operated from the same driving-shaft, by the segmental gear-connections.

What I claim as my invention and improvement in the above-described amalgamating-disk, is—

Making slotted openings D D', with dovetailing ends, to receive a crank-connection, or segmental rack, substantially as described.

In witness whereof, I have hereunto set my hand and seal.

SOLOMON JOHNSON. [L. S.]

Witnesses:
C. W. M. SMITH,
GEO. H. STRONG.